United States Patent [19]
Rockstroh et al.

[11] Patent Number: 6,094,260
[45] Date of Patent: Jul. 25, 2000

[54] HOLOGRAPHIC INTERFEROMETRY FOR MONITORING AND CONTROLLING LASER SHOCK PEENING

[75] Inventors: Todd J. Rockstroh, Maineville; Wilbur D. Scheidt, Cincinnati, both of Ohio

[73] Assignee: General Electric Company, Cincinnati, Ohio

[21] Appl. No.: 09/133,100

[22] Filed: Aug. 12, 1998

[51] Int. Cl.⁷ .................................................. G01B 9/02
[52] U.S. Cl. .................... 356/35.5; 356/347; 148/510; 148/900; 148/903
[58] Field of Search ................ 356/35.5, 347; 148/510, 900, 903

[56] References Cited

U.S. PATENT DOCUMENTS

| | | |
|---|---|---|
| 3,631,713 | 1/1972 | Marom . |
| 3,911,733 | 10/1975 | Bhuta et al. ................................ 73/88 |
| 4,139,302 | 2/1979 | Hung et al. . |
| 4,690,552 | 9/1987 | Grant et al. ............................ 356/35.5 |
| 4,702,594 | 10/1987 | Grant ..................................... 356/35.5 |
| 5,113,079 | 5/1992 | Matulka .................................. 250/550 |
| 5,146,289 | 9/1992 | Newman . |
| 5,189,490 | 2/1993 | Shetty et al. . |
| 5,339,152 | 8/1994 | Horn . |
| 5,432,595 | 7/1995 | Pechersky . |
| 5,481,356 | 1/1996 | Pouet et al. ............................ 356/35.5 |
| 5,519,486 | 5/1996 | Baird et al ............................. 356/35.5 |
| 5,523,839 | 6/1996 | Robinson et al. . |
| 5,591,009 | 1/1997 | Mannava et al. . |
| 5,625,664 | 4/1997 | Berkley . |
| 5,671,042 | 9/1997 | Sciammarella . |
| 5,674,328 | 10/1997 | Mannava et al. . |
| 5,674,329 | 10/1997 | Mannava et al. . |
| 5,756,965 | 5/1998 | Mannava . |
| 5,948,293 | 10/1999 | Somers et al. ..................... 219/121.85 |

OTHER PUBLICATIONS

"The Development of New Type Almen Strip for Measurement of Peening Intensity on Hard Shot Peening", by Y. Watanabe, K. Namiki, Sep., 1992, 6 pages.

"New Results In Measuring The Shot Peen Interface In Ti6 4V", by Eddy Current, Jul., 1991, 11 pages.

"X–Ray Diffraction Characterization of Residual Stresses Produced by Shot Peening", by Paul S. Prevey, pp. 82–93.

"Full Assurance Shot Peening Of Aircraft Gas Turbine Engine Components", by PG Bailey, DR Lomardo, HG Popp, RA Thompson, 1996, pp. 320–327.

"Residual Stress Measurment For Quality Control of Shot Peening", by Lambda Research, 2 pages.

"Laser shocking extends fatigue life", by John A. Vaccari, American Machinist, Jul., 1992, 3 pages.

"Laser Shock Processing Increases the Fatigue Life of Metal Parts", Materials and Processing Report, Sep., 1991, pp. 3–5.

"Shearography", ETH Zurich, Festigkeit, Versuch und Messtechnik, Prof. Dr. M. Meier, Jul. 16, 1998, 5 pages.

"Holographic Interferometry", Jul. 16, 1998, 2 pages.

*Primary Examiner*—Robert H. Kim
*Assistant Examiner*—Andrew H. Lee
*Attorney, Agent, or Firm*—Andrew C. Hess; Gerry S. Gressel

[57] ABSTRACT

A method for quality assurance of a laser shock peening process uses interferometry to form a fringe image from first and second interferograms of unstressed and stressed laser shock peened patches respectively of a workpiece. The fringe image may then be compared to a predetermined correlation of fringe images for indicating quality assurance. Stressing the laser shock peened patch may include loading the production and test workpieces during the production of the first and second images by interferometry while the production and test workpieces are fixtured. The loading may be done by heating, twisting, or bending of at least a portion of the production and test workpieces. The comparing of the production images of fringes may include comparing fringe characteristics of the laser shock peened patches on the production workpieces laser against fringe characteristics of the predetermined correlation.

20 Claims, 6 Drawing Sheets

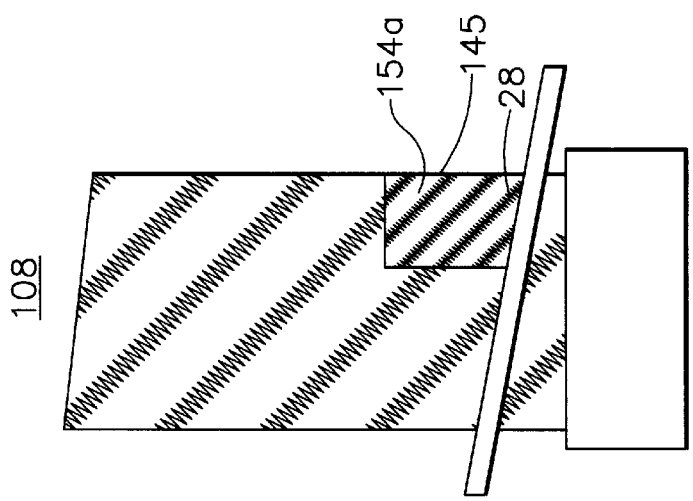
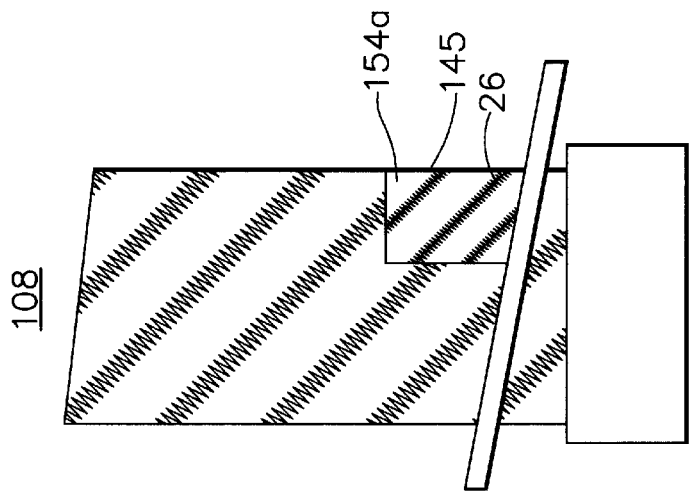
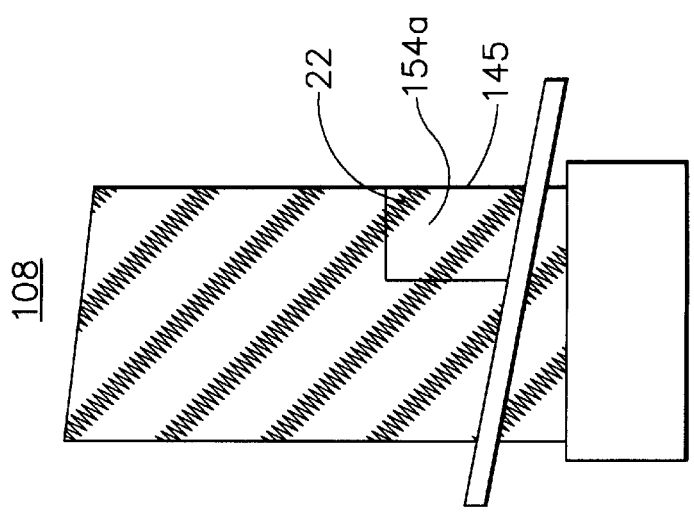

HOLOGRAPHIC INTERFEROMETRY FOR MONITORING AND CONTROLLING LASER SHOCK PEENING

BACKGROUND OF THE INVENTION

1. Field of the Invention

This invention relates to quality assurance (QA) methods for surface treatment of a substrate surface such as peening and, more particularly, for using holographic interferometry for quality assurance of laser shock peening processes.

2. Description of Related Art

Laser shock peening or laser shock processing, as it is also referred to, is a process for producing a region of deep compressive residual stresses imparted by laser shock peening a surface area of a workpiece. Laser shock peening typically uses multiple radiation pulses from high power pulsed lasers to produce shock waves on the surface of a workpiece similar to methods disclosed in U.S. Pat. No. 3,850,698, entitled "Altering Material Properties"; U.S. Pat. No. 4,401,477, entitled "Laser Shock Processing"; and U.S. Pat. No. 5,131,957, entitled "Material Properties". Laser shock peening, as understood in the art and as used herein, means utilizing a laser beam from a laser beam source to produce a strong localized compressive force on a portion of a surface by producing an explosive force by instantaneous ablation or vaporization of a painted or coated or uncoated surface. Laser peening has been utilized to create a compressively stressed protection layer at the outer surface of a workpiece which is known to considerably increase the resistance of the workpiece to fatigue failure as disclosed in U.S. Pat. No. 4,937,421, entitled "Laser Peening System and Method". These methods typically employ a curtain of water flowed over the workpiece or some other method to provide a confining medium to confine and redirect the process generated shock waves into the bulk of the material of a component being LSP'D to create the beneficial compressive residual stresses.

Laser shock peening is being developed for many applications in the gas turbine engine field, some of which are disclosed in the following co-pending U.S. patent application Ser. No. 08/362,362 entitled "ON THE FLY LASER SHOCK PEENING", filed Dec. 22, 1994; and U.S. Pat. No. 5,591,009, entitled "Laser shock peened gas turbine engine fan blade edges"; U.S. Pat. No. 5,569,018, entitled "Technique to prevent or divert cracks"; U.S. Pat. No. 5,531,570, entitled "Distortion control for laser shock peened gas turbine engine compressor blade edges"; U.S. Pat. No. 5,492,447, entitled "Laser shock peened rotor components for turbomachinery"; U.S. Pat. No. 5,674,329, entitled "Adhesive tape covered laser shock peening"; and U.S. Pat. No. 5,674,328, entitled "Dry tape covered laser shock peening", all of which are assigned to the present Assignee. These applications, as well as others, are in need of efficient quality assurance testing during production runs using laser shock peening.

Laser shock peening processes have been developed to simultaneously LSP pressure and suction sides of leading and trailing edges of fan and compressor airfoils and blades as disclosed in U.S. Pat. No. 5,591,009 entitled "Laser shock peened gas turbine engine fan blade edges" and U.S. Pat. No. 5,531,570 entitled "Distortion control for laser shock peened gas turbine engine compressor blade edges". LSP is a deep treatment of the material and it is desirable to have a quality assurance test that is indicative of a volumetric LSP effect. It is also desirable to have a QA method that is compatible with a dual sided or simultaneous dual sided LSP process wherein substantially equal compressive residual stresses are imparted to both sides of a workpiece, i.e. along the leading edge of a gas turbine engine fan blade.

Conventional high cycle fatigue (HCF) testing of blades having leading edges which are LSP'd and notched before testing has been tried as a quality assurance technique. This method is destructive of the workpiece, fairly expensive and time consuming to carry out, and significantly slows production and the process of qualifying LSP'd components. An improved quality assurance method of measurement and control of LSP that is a non-destructive evaluation (NDE), inexpensive, accurate, and quick is highly desirable. It is also desirable to have an NDE quality assurance method that is relatively inexpensive and sufficiently economical to be used on each workpiece instead of a sampling of workpieces. LSP is a process that, as any production technique, involves machinery and is time consuming and expensive. Therefore, any techniques that can reduce the amount or complexity of production machinery and/or production time are highly desirable.

The present invention uses holographic interferometry for laser shock peening quality assurance. Holographic interferometry is a well known non-destructive evaluation or examination (NDE) technology used to test and evaluate surfaces. Interferometry has been known and studied for many years. In its simplest form optical interferometry involves providing a measuring beam and a reference beam so that the measuring beam is reflected off of the test item and the reference beam is reflected off of a fixed object, typically a mirror, the two beams are recombined, and an interference or fringe pattern is created which is proportional to the phase difference imparted on the measuring beam by the surface of the test object. The present invention provides a holographic interferometry method to evaluate a region of deep compressive residual stresses imparted by laser shock peening a surface area of a workpiece.

U.S. Pat. No. 5,523,839 discloses an on-line manufacturing process control system and method that uses a twin or dual beam heterodyned optical interferometer to monitor changes in the surface characteristics of an object while the object is being manufactured. Changes in surface characteristics can then be used as data by automated equipment to determine whether the manufactured object monitored at a given time meets predetermined quality standards.

U.S. Pat. No. 4,725,142 discloses a method and apparatus for holographic interferometry inspection to determine and characterize effects of intermittent stressing of objects.

U.S. Pat. No. 4,139,302 discloses a method and apparatus for interferometric deformation analysis that produces superimposed interference fringes arrayed as a function of the deformation which results in the object from an applied stress, which may be mechanical, thermal, or the like. This method is used to analyze anomalous deformation which may have resulted from the design of the object or from anomalous structural characteristics of the object, such as cracks, subsurface separations, voids or inclusions or areas of non-uniform strength which affect the surface deformation. The U.S. Pat. No. 4,139,302 patent offers as an alternative to holographic interferometry, its method and suggests that its invention may be employed in all the applications that have been suggested for holographic interferometry including the detection of cracks in welds, of subsurface voids, separations and non-uniformities in vehicle tires, separations in sandwich honeycombs and other fabricated structures, etc. The object is first illuminated with coherent light. The illuminated surface is then photographed with a camera having an optical wedge disposed over half of its lens to record two slightly displaced overlapping images of the object on the camera film. The object is then stressed by changing the ambient temperature or pressure or other mechanical loading, and the undeveloped film is exposed to a second set of overlapping images. The developed photograph contains a set of equal amplitude fringes representing the interference pattern between the two fringe sets generated by the two exposures and arrayed as a function of the strain in the object as a result of the stress. To render the fringe set visible, an image of the object is projected on a screen through a Fourier, fringe-frequency sensitive filter, which enhances the fringe contrast on the resulting image of the object.

U.S. Pat. No. 5,432,595 discloses a method and apparatus for measuring residual stress in a material comprising the steps of establishing a speckle pattern on the surface with a first laser then heating a portion of that pattern with an infrared laser until the surface plastically deforms. Then comparing the speckle patterns before and after deformation by subtracting one pattern from the other will produce a fringe pattern that serves as a visual and quantitative indication of the degree to which the plasticized surface responded to the stress during heating and enables calculation of the stress. The method was developed for accurately measuring the residual stresses in individual parts so that a designer can predict failure with greater certainty and design to avoid failure or to relieve the stresses. The method is designed to measure surface stresses at the surface of a metal object.

However, none of the prior art uses holographic interferometry to analyze or inspect deep compressive residual stresses imparted by laser shock peening a surface area of a workpiece for the purpose of quality assurance. The prior art does not appear to offer or suggest any use of holographic interferometry or any type of interferometry as a method for qualitative assurance of laser shock peening.

SUMMARY OF THE INVENTION

A method for quality assurance of a laser shock peening process uses interferometry to form a fringe image from first and second interferograms of unstressed and stressed laser shock peened patches respectively of a workpiece. The fringe image may then be compared to a predetermined correlation of fringe images for indicating quality assurance.

More specifically, the method for quality control of a laser shock peening process of production workpieces includes the following steps: (a) producing a first interferometric image of a laser shock peened patch on one of the workpieces, wherein the laser shock peened patch has at least a first laser shock peened surface and a first laser shocked region having deep compressive residual stresses imparted by the laser shock peening extending into the workpiece from the first laser shock peened surface; (b) producing a second interferometric image of the laser shock peened patch while stressing the laser shock peened patch; and (c) producing an image of fringes by overlapping the first and second interferometric images. The method may further include (d) comparing the images of fringes of at least some of the production workpieces in a laser shock peening production run of the production workpieces to a predetermined correlation of images of fringes and high cycle fatigue failure based on high cycle fatigue tests of test workpieces with shock peened patches. The high cycle fatigue tests are preferably run on test workpieces having a failure precipitating flaw within the shock peened patches.

The interferometric images may be produced by holographic laser interferometry including reflecting a low power measuring laser beam off of the patch onto a interferometric image recording means for recording interferometric images while simultaneously directing a low power reference laser beam onto the interferometric image recording means.

The interferometric image recording means may be a photographic plate, digital camera, photographic camera, or their equivalent. Stressing the laser shock peened patch may include loading the production and test workpieces during the production of the first and second images by interferometry while the production and test workpieces are fixtured. The loading may be done by controlled heating, twisting, or bending of at least a portion of the production and test workpieces. The comparing of the production images of fringes may include comparing fringe characteristics of the laser shock peened patches on the production workpieces laser against fringe characteristics of the predetermined correlation. The fringe characteristics may include density, intensity, or breadth of fringe lines.

ADVANTAGES

Advantages of the present invention are numerous and include lowering the cost, time, man power and complexity of performing quality assurance tests during laser shock peening processes. The present invention reduces destructive testing of expensive workpieces. Another advantage of the present invention is that it allows performing quality assurance tests during laser shock peening processes at the site of the process and in real time with respect to the processing and on the component or workpiece being laser shock peened. This also allows for all the workpieces to be tested for quality assurance not just a sampling. The present invention can help greatly reduce the amount of down time for performing quality assurance tests during laser shock peening. The present invention replaces the tedious, costly and time consuming process of notched high cycle fatigue testing presently used for QA. It also allows the laser shock peened patch on the workpiece to be processed for quality assurance directly instead of by proxy such as with a test strip or coupon and, therefore, be a more direct test of the laser shock peening process and parameters. Such parameters include laser energy, laser shock peened spot pattern and number of layers of such patterns on the workpieces (such as gas turbine engine blades). The QA process can be performed in tandem with the laser shock peening process of the actual component or workpiece, thus, allowing the testing to be performed at a point in time which is more contemporaneous in time and matches the state of the process for each specific component that is laser shock peened. Alternatively, components can be qualified on a lot-by-lot basis if so desired.

BRIEF DESCRIPTION OF THE DRAWINGS

The foregoing aspects and other features of the invention are explained in the following description, taken in connection with the accompanying drawings where:

FIG. 3 is a schematic two dimensional illustration of a non-laser shock peened test fan blade and it's fringe pattern interferogram of the blade in FIG. 1.

FIG. 4 is a schematic two dimensional illustration of a moderately laser shock peened patch on a test fan blade and it's fringe pattern interferogram exemplifying an unacceptable laser shock peened test blade.

FIG. 5 is a schematic two dimensional illustration of a properly laser shock peened patch on a test fan blade and it's fringe pattern interferogram exemplifying an acceptable laser shock peened test blade.

DETAILED DESCRIPTION OF THE INVENTION

Figure 1:
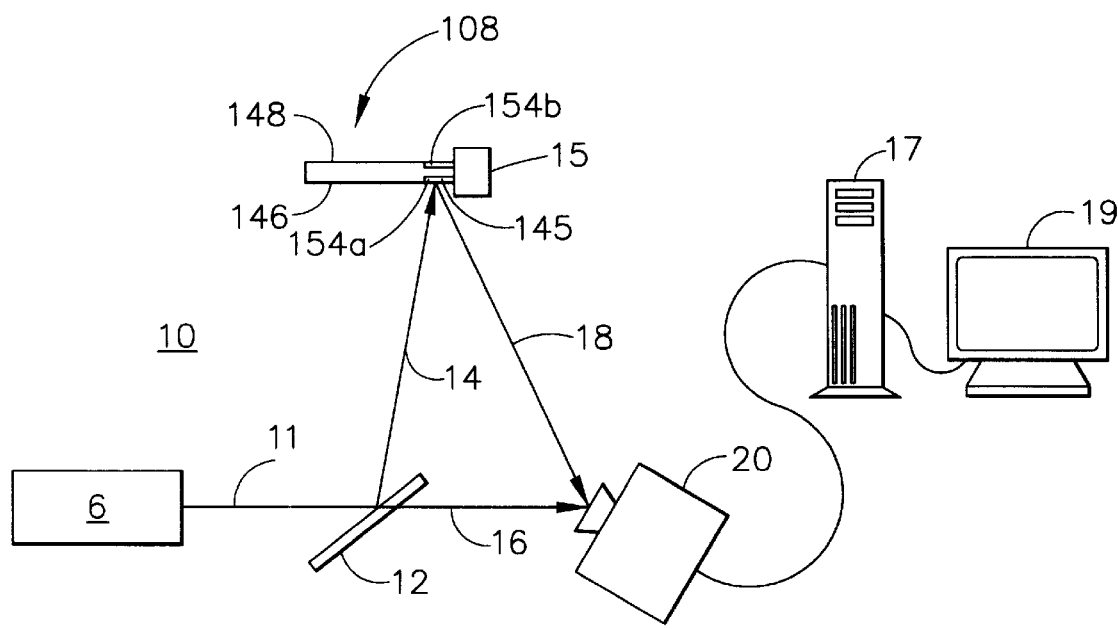
FIG. 1 is a schematic illustration of a holographic interfeometry system set up for producing an interferogram of an unstressed laser shock peened patch of a fan blade in accordance with an exemplary embodiment of the method of the present invention.
Figure 2:
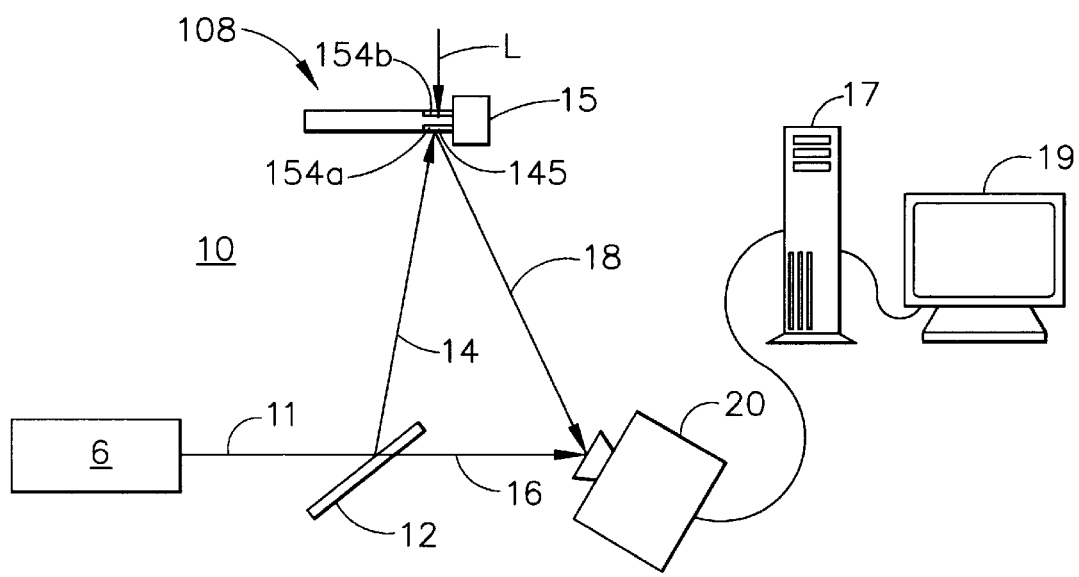
FIG. 2 is a schematic illustration of the holographic interferometry system in FIG. 1 set up for producing a fringe image from the first interferogram overlayed with a second interferogram of a stressed laser shock peened patches of a fan blade in accordance with an exemplary embodiment of the method of the present invention.

Quality assurance is typically a go or no go, pass or fail, accept or reject type of analysis. The method and techniques of the present invention involves quality assurance of the laser shock peening process on a production workpiece such as an exemplary aircraft turbofan gas turbine engine fan blade 108 illustrated in the Figures. Illustrated in FIGS. 1 and 2 is a schematic representation of a holographic laser interferometry system 10 used to perform a quality assurance method for quality control of a laser shock peening process. The system 10 is used for production and test workpieces exemplified by the blade 108 having the laser shock peened patch 145.

Figure 6:
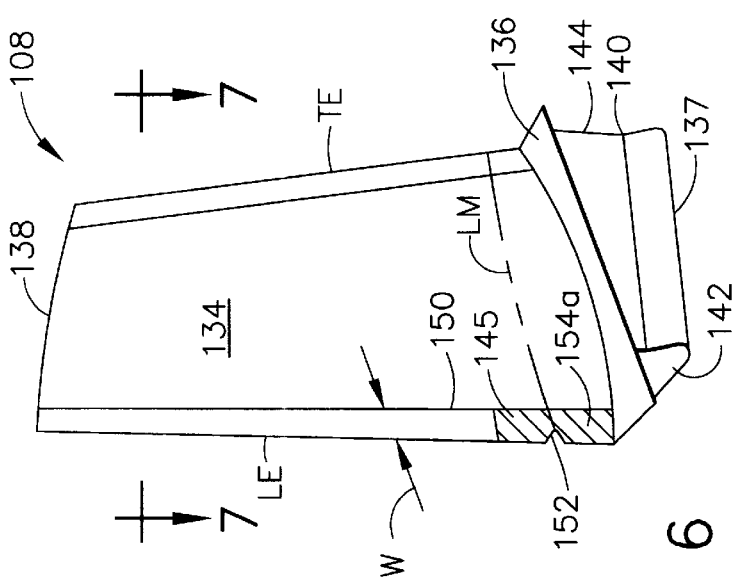
FIG. 6 is a perspective view of a fan blade exemplifying a workpiece for which the system in FIG. 1 may be used in a quality assurance inspection.
Figure 7:
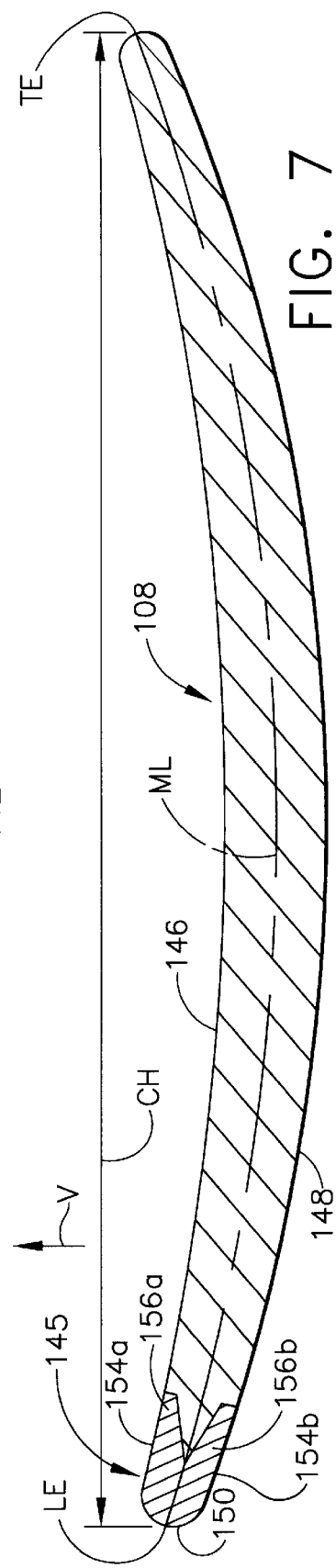
FIG. 7 is a cross-sectional view of the processed fan blade in FIG. 6.

Referring to FIGS. 6 and 7, the fan blade 108 includes an airfoil 134 extending radially outward from a blade platform 136 to a blade tip 138. The fan blade 108 includes a root section 140 extending radially inward from the platform 136 to a radially inner end 137 of the root section 140. At the radially inner end 137 of the root section 140 is a blade root 142 which is connected to the platform 136 by a blade shank 144. The airfoil 134 extends in the chordwise direction between a leading edge LE and a trailing edge TE of the airfoil. A chord CH of the airfoil 134 is the line between the leading edge LE and trailing edge TE at each cross-section of the blade as illustrated in FIG. 7. A pressure side 146 of the airfoil 134 faces in the general direction of rotation as indicated by an arrow V and a suction side 148 is on the other side of the airfoil and a mean-line ML is generally disposed midway between the two sides in the chordwise direction.

The fan blade 108 has a leading edge section 150 that extends along the leading edge LE of the airfoil 134 from the blade platform 136 to the blade tip 138. The leading edge section 150 includes a predetermined first width W such that the leading edge section 150 encompasses an area where nicks and tears that may occur along the leading edge of the airfoil 134 during engine operation. The airfoil 134 subject to a significant tensile stress field due to centrifugal forces generated by the fan blade 108 rotating during engine operation. The airfoil 134 is also subject to vibrations generated during engine operation and the nicks and tears operate as high cycle fatigue stress risers producing additional stress concentrations around them.

To counter fatigue failure of portions of the blade along possible crack lines that can develop and emanate from the nicks and tears a laser shock peened patch 145 is placed along a portion of the leading edge LE where incipient nicks and tears may cause a failure of the blade due to high cycle fatigue. The laser shock peened patch 145 is placed along a portion of the leading edge LE where an exemplary predetermined first mode line L of failure may start. Within the laser shock peened patch 145, at least one and preferably both the pressure side 146 and the suction side 148 are simultaneously laser shock peened to form first and second oppositely disposed laser shock peened blade surfaces 154a and 154b and a pre-stressed blade regions 156a and 156b, respectively, having deep compressive residual stresses imparted by laser shock peening (LSP) extending into the airfoil 134 from the laser shock peened surfaces as seen in FIG. 2. The pre-stressed blade regions 156a and 156b are illustrated along only a portion of the leading edge section 150 but may extend along the entire leading edge LE or longer portion thereof if do desired.

Figure 8:
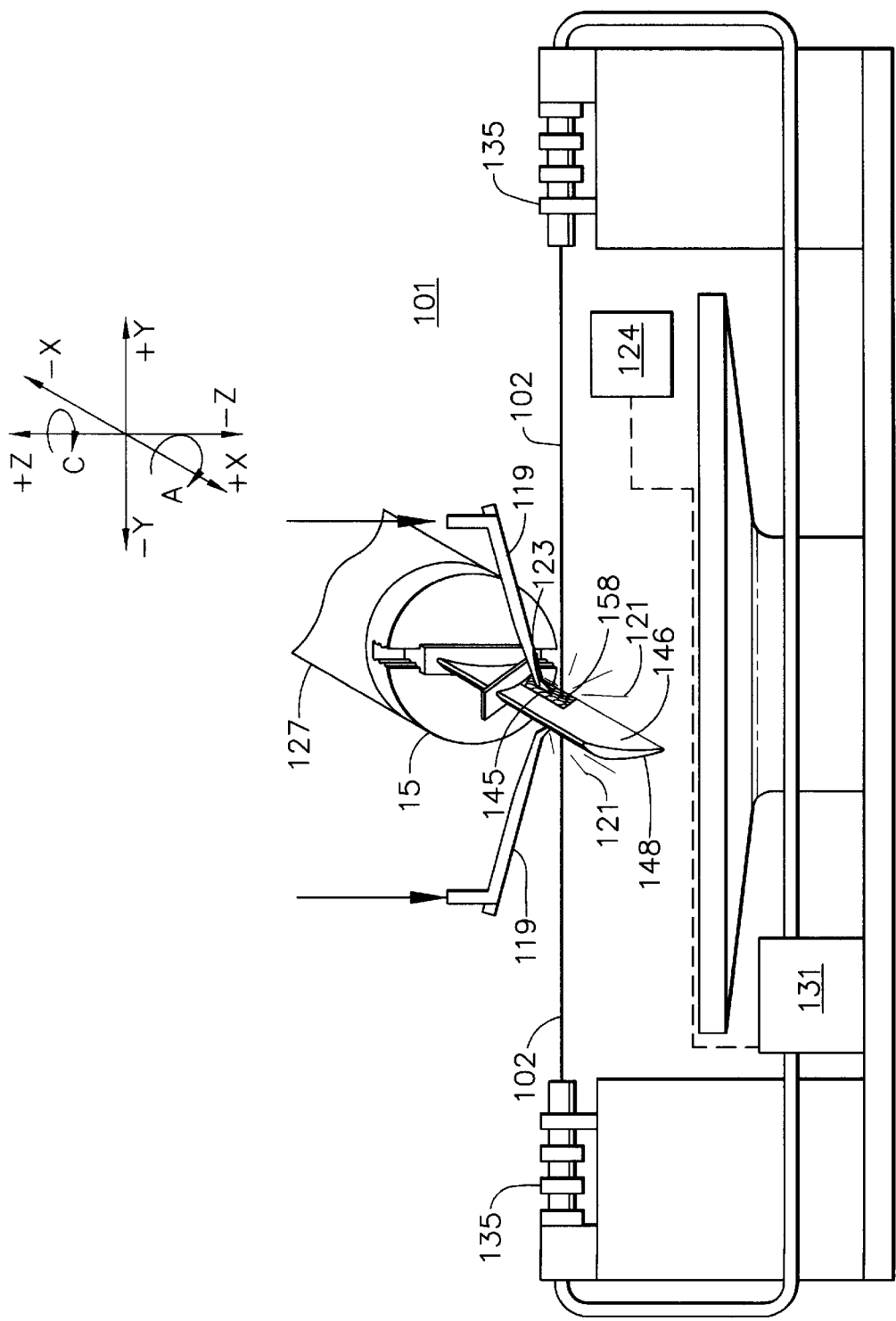
FIG. 8 is a schematic perspective illustration of the blade of FIG. 1 mounted in a laser shock peening system in accordance with an exemplary use of the present invention.
Figure 9:
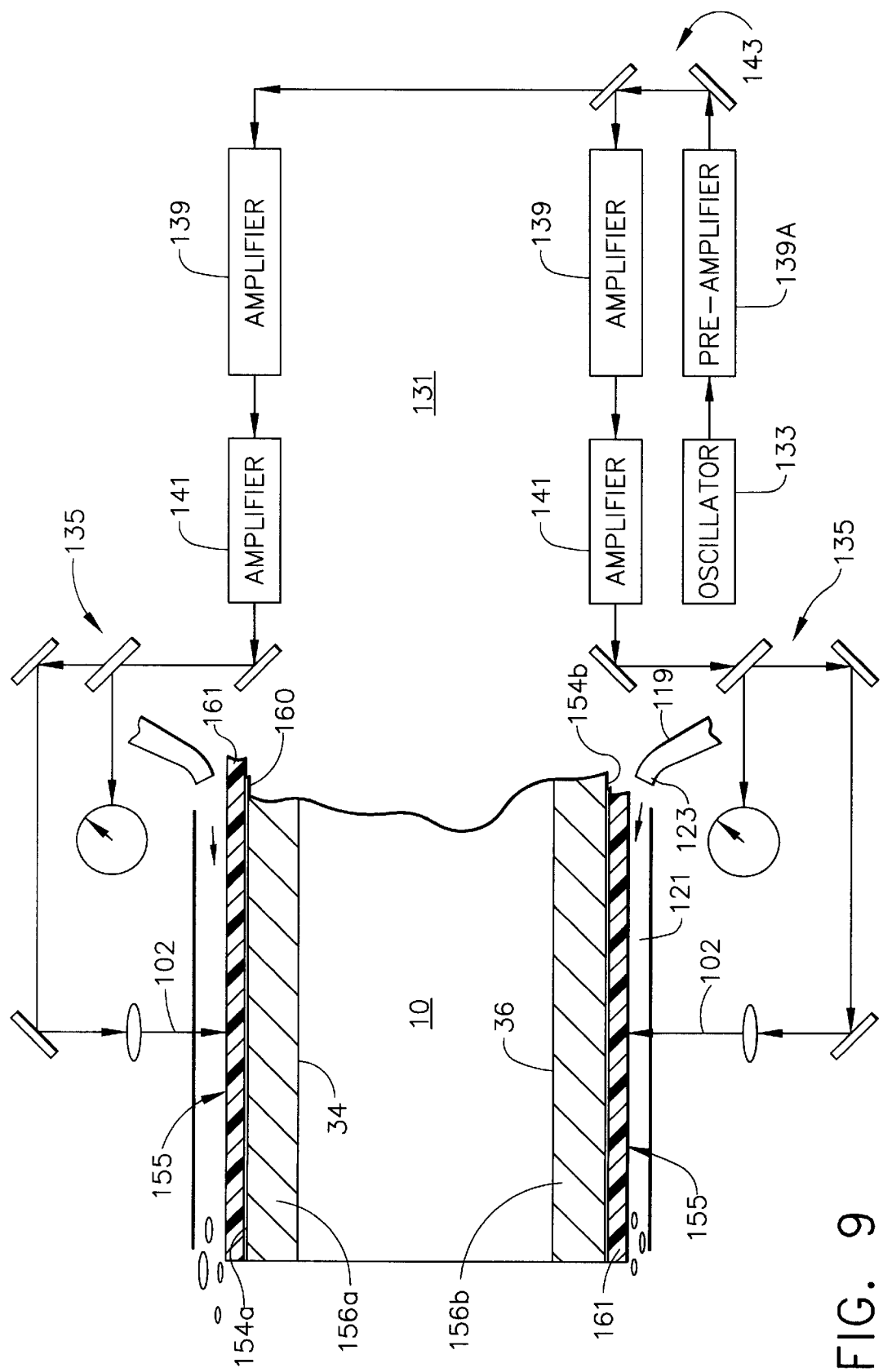
FIG. 9 is a schematic illustration of the laser shock peening of FIG. 8.

Referring again to FIGS. 1 and 2, the quality assurance method of the present invention includes the following steps: (a) producing a first interferometric image of one of the laser shock peened blade surfaces 154a and 154b of the laser shock peened patch 145 on the blade 108 using a relatively low power laser 6 to produce a low power laser beam 11 which is passed through an optical splitter 12 which splits the low power laser beam 11 into an object beam 14 and a reference beam 16. The object beam 14 is used to illuminate one of the pressure or suction sides 146 or 148, respectively, of the airfoil 134 and to produce a reflected beam 18 which is directed to interferometric recording means which is illustrated herein as a holographic or interferometric camera 20. In the preferred embodiment of the invention the camera 20 is an electronic or digital type such as a CCD camera connected to a computer 17 to display results on an electronic monitor such as a TV or video screen or monitor or computer display or monitor 19. This allows an operator on the production line to use this method to examine some or all of the production workpieces for quality assurance in real time and with a minimal impact on the overall production of the workpieces. Tests have been conducted using gel plate cameras and many other types of cameras and recording means are well known and abound in the field, some of which are disclosed in the cited references. FIG. 2 illustrates the next step (b) which produces a second interferometric image of the same blade 108, laser shock peened patch, and airfoil side as in step (a) while stressing the laser shock peened patch by applying a load L to the blade 108. Load L may be a thermal load applied by heating the blade with a more powerful laser than the low powered laser 6. The more powerful laser may be the laser system that produces relatively high power laser beams 102 for laser shock peening the blades 108 as illustrated in FIGS. 8 and 9. Alternatively, load L may be a mechanical load applied by a slight twisting or bending of the blade while the blade is held in a fixture 15.

Next is step (c) in which a fringe image containing first fringes 22 is produced by overlapping the first and second interferometric images as illustrated in FIG. 3 for a non-laser shock peened blade 108. This is done most easily by using the same holographic or photographic on the plate and leaving it in the camera 20, while the load L is applied to the blade 108 and the second interferometric image or interferogram produced overlapping the first. Illustrated in FIG. 4 is the blade 108 that has a moderately laser shock peened patch 145 and corresponding second fringes 26 emanating from the patch that are different from the first fringes 22 and indicate the quality of the laser shock peening process and the laser shock peened patch. Illustrated in FIG. 5 is the blade 108 that has is more laser shock peened than the blade 108 in FIG. 4 and has corresponding third fringes 28 emanating from the patch 145 that are different from the first and second fringes and indicate a different quality of the laser shock peening process and the laser shock peened patch. Initial tests indicated that the second and third fringes 26 and 28 emanating from a laser shock peened patch are thicker, more closely spaced together, and have a different orientation than the first fringes 22 emanating from the non-laser shock peened areas of the blade in the interferograms. The differences shown in FIGS. 3, 4 and 5 are for illustration purposes only and may vary with workpiece and component and material.

It may be preferable in a production setting to employ a step (d) comparing the images of fringes of at least some of the production blades 108 in a laser shock peening production run of the blades to a predetermined correlation of images of fringes and cyclic fatigue failure based on fatigue tests of test blades 108 with shock peened patches may be used. The exemplary cyclic fatigue failure is due to high cycle fatigue where failure occurs along a nodal line of vibrational modes of resonance.

The high cycle fatigue (HCF) correlation of the blades 108 is preferably based on fatigue testing of laser shock peened and notched test pieces, that are preferably full scale test blades, to precipitate a failure. The test pieces or blades 108 are preferably made the same way as the actual production blades or work pieces. The HCF testing may be used to establish pass/fail criteria for use during production runs. A number of blades 108 or just one blade 108 may be notched and subjected to high cycle fatigue tests to establish the correlation. For high cycle fatigue each test, one laser shock peened blade 108 has a notch 152, representing a failure precipitating flaw, placed in the leading edge LE about a predetermined position of the pre-stressed blade regions 156 after the blade is laser shock peened. Preferably the notch 152 is also centered about a predetermined mode line such as the first mode line L. Fringe patterns are made and recorded for correlation purposes later on and the blade 108 is vibrated at its first mode frequency until it fails. If it meets standards or test criteria on length of time and amplitude of the forcing function that is exiting the blade, then it is acceptable. These results can then be used during production runs to qualify the laser shock peening process. It is contemplated that one calibration can be used for an entire production run as long as the production laser shock peening parameters do not change.

Illustrated in FIGS. 8 and 9 is a laser shock peening system 101 for laser shock peening the blade 108. The blade 108 is mounted in the fixture 15 which is attached to a five-axis computer numerically controlled (CNC) manipulator 127, commercially available from the Huffman Corporation, having an office at 1050 Huffman Way, Clover, SC 29710. The five axes of motion that are illustrated in the exemplary embodiment are conventional translational axes X, Y, and Z, and conventional rotational axes A and C that are well known in CNC machining. The manipulator 127 is preferably used to move and position the blade 108 and to effect laser shock peening "on the fly" in accordance with a laser shock peening method and of the present invention. The manipulator 127 is used to continuously move and position the blade to provide laser shock peening "on the fly" in accordance with one embodiment of the present invention. Laser shock peening may be done in a number of various ways using paint or tape as an ablative medium (see—in particular U.S. Pat. No. 5,674,329 entitled "Adhesive Tape Covered Laser Shock Peening"). The same laser shock peening apparatus is used in the laser shock peening process of the leading edge section 150 of the blade 108 for both test and production ones of the blades 108 (representing the test pieces and work pieces).

In accordance with a preferred embodiment of the present invention, the area to be laser shock peened and form the laser shock peened patch 145, the first and second laser shock peened surfaces 154a and 154b are covered with an ablative coating 161 such as paint or preferably adhesive tape to form a coated surface 155 as disclosed in U.S. Pat. Nos. 5,674,329 and 5,674,328. In the exemplary embodiments illustrated herein, layers of adhesive tape are used as the ablative coating 161. Other laser shock peening processes may paint the first and second laser shock peened surfaces 154a and 154b for each sequence of laser shock peening firings. The paint and tape provide an ablative medium preferably over which is a clear containment medium which may be a clear fluid curtain such as a flow of water 121.

The laser beam shock induced deep compressive residual stresses may be produced by repetitively firing two high power laser beams 102, each of which is defocused ± a few mils with respect to the coated surfaces 155 on both the first and second laser shock peened surfaces 154a and 154b of the blade 108. Each of the laser beams is preferably fired through the curtain of flowing water 121 that is flowed over the coated surfaces 155. The paint, tape, or other ablative coating 161 is ablated generating plasma which results in shock waves on the surface of the material. Other ablative materials may be used to coat the surface as suitable alternatives to paint. These coating materials include metallic foil or adhesive plastic tape as disclosed in U.S. Pat. Nos. 5,674,329 and 5,674,328. These shock waves are re-directed towards the coated surface 155 by the curtain of flowing water 121 to generate travelling shock waves (pressure waves) in the material below the coated surface. The amplitude and quantity of these shockwaves determine the depth and intensity of compressive stresses. The ablative coating is used to protect the target surface and also to generate plasma. The laser beam shock induced deep compressive residual stresses in the compressive pre-stressed regions 156 are generally about 50–150 KPSI (Kilo Pounds per Square Inch) extending from the first and second laser shock peened surfaces 154a and 154b, respectively, to a depth of about 20–50 mils into the pre-stressed regions 156.

The blade 108 is continuously moved while continuously firing the stationary high power laser beams 102 through a curtain of flowing water 121 on the coated surfaces 155 and forming spaced apart laser shock peened circular spots 158. The blades 108 are preferably laser shock peened the same way during production runs and HCF testing runs for the correlation. The curtain of water 121 is illustrated as being supplied by a conventional water nozzle 123 at the end of a conventional water supply tube 119. The laser shock peening system 101 has a conventional generator 131 with an oscillator 133 and a pre-amplifier 139A and a beam splitter 143 which feeds the pre-amplified laser beam into two beam optical transmission circuits each having a first and second amplifier 139 and 141, respectively, and optics 135 which include optical elements that transmit and focus the laser beam 102 on the coated surfaces 155. A controller 124 may be used to modulate and control the laser shock peening system 101 to fire the laser beams 102 on the coated surfaces 155 in a controlled manner. Ablated coating material is washed out by the curtain of flowing water 121.

The present invention provides that the surface to be laser shock peened be adhesively covered with at least one layer of the tape 159 to provide the taped coated surface 155, though more than one layer is certainly contemplated by the present invention. Preferably, the tape 159 is self adhesive having an adhesive layer 160 of adhesive material and an ablative coating 161 of ablative material as illustrated in FIG. 9. Suitable materials for the ablative layer include plastic such as vinyl plastic film and foil. One suitable source for the tape 159 is Scotch Brand NO. 471 Plastic Film Tape which can be had with a black pigmented vinyl plastic backing, about 4 mils thick, and has a rubber adhesive layer, about 1 mil thick. The ablative medium in the form of the tape 159 without an adhesive layer may also be used with a suitable adhesive material applied directly to the first and second laser shock peened surfaces 154a and 154b, respectively. The tape 159 should be rubbed or otherwise pressed against the metallic material of the patch 145 to remove bubbles that may remain between the tape and the first and second laser shock peened surfaces 154a and 154b, respectively.

The preferred embodiment of the method of the present invention includes continuously moving the blade while continuously firing the laser beam on the taped surface and adjacent laser shock peened circular spots may be hit in different sequences. However, the laser beam may be moved instead just so long as relative movement between the beam and the surface is effected.

Figure 10:
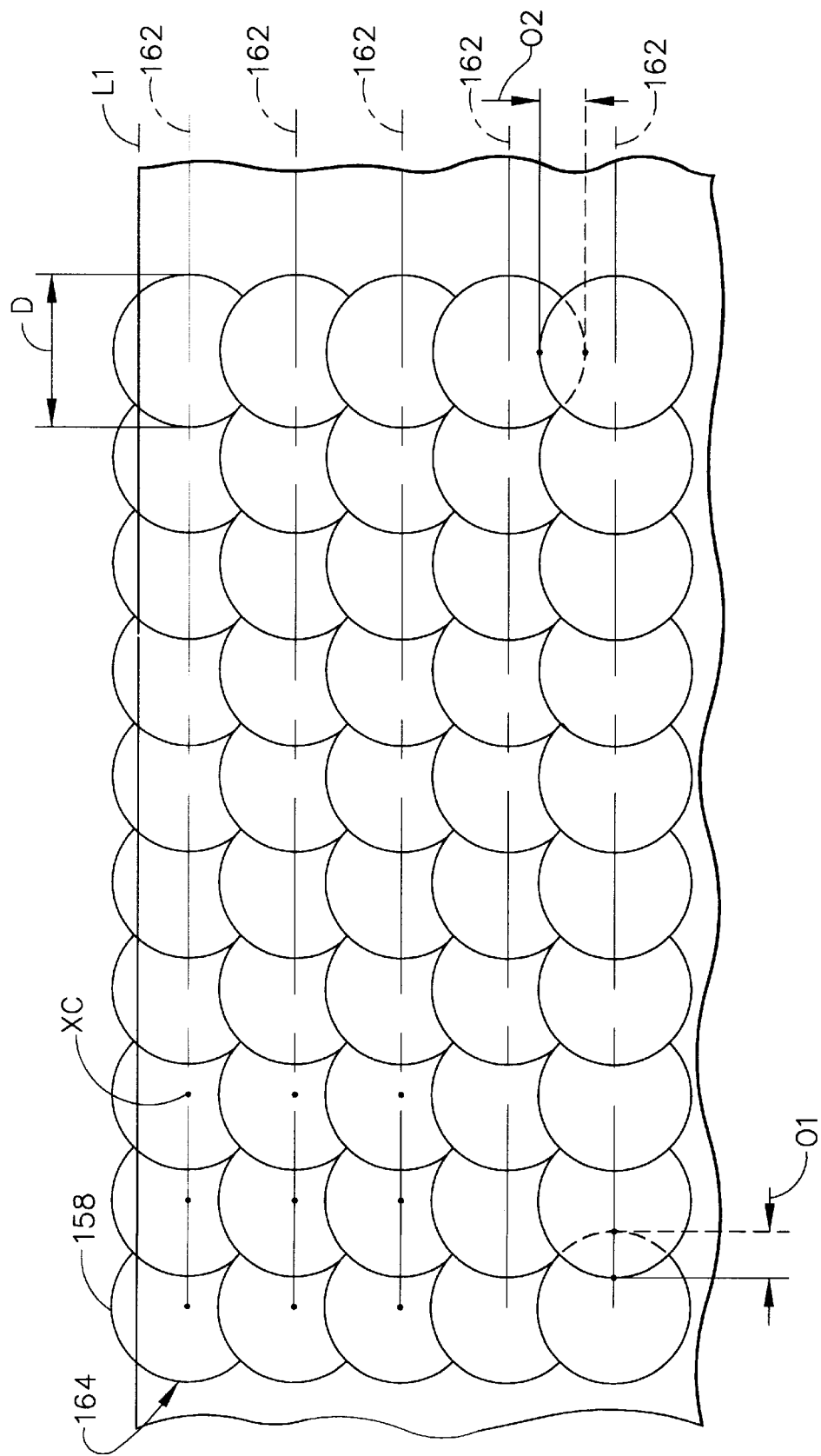
FIG. 10 is a schematic illustration of a pattern of laser shocked peened circular spots on a laser shock patch of the blade in FIGS. 1–5.

In accordance with one embodiment of the present invention, the first and second laser shock peened blade surface 154a and 154b (before they are laser shock peened) of the blade 108 are covered by a layer of the adhesive tape and then the surfaces are laser shock peened forming overlapping laser shocked peened circular spots 158 as illustrated in FIGS. 8 and 10. The preferred laser shock peening processes includes coating or taping the first and second laser shock peened blade surface 154a, respectively, of the patch 145 for each sequence of laser shock peening firings. Several sequences may be used to cover the entire area of the patch 145.

FIG. 10 illustrates an exemplary pattern of stacked rows of overlapping laser shocked peened circular spots 158 (indicated by the circles). All the laser shocked peened circular spots 158 with their corresponding centers XC lie along a row centerline 162. The pattern of sequences entirely covers the laser shock peening coated surface 155. The laser shocked peened circular spots 158 have a diameter D in a row 164 of overlapping laser shock peened circular spots. The pattern may be of multiple overlapping rows 164 of overlapping shock peened circular spots on the laser shock peening coated surface 155. A first exemplary overlap, illustrated as about 30%, is between adjacent laser shock peened circular spots 158 in a given row. The overlap is typically defined by a first offset O1 between centers XC of the adjacent laser shock peened circular spots 158 and though illustrated as 30% it can vary from about 30%–50% or more of the diameter D. A second overlap is between adjacent laser shock peened circular spots 158 in adjacent rows and is generally defined by a second offset O2 between adjacent row centerlines 162 and though illustrated as 30% it can vary from about 30%–50% of the diameter D depending on applications and the strength or fluency of the laser beam. The pattern is referred to as stacked because the centers XC of adjacent circular spots 158 in adjacent rows are all linearly aligned. Other patterns are disclosed in the references, see U.S. Pat. Nos. 5,591,009, 5,674,329 and 5,674,328.

Several sequences may be required to produce the entire pattern and re-taping of the first and second laser shock peened surfaces 154a and 154b, respectively, of the patch 145 is done between each sequence of laser firings. The test piece and workpiece versions of the blade 108 are preferably laser shock peened in the same manner to form the same sequences and patterns of laser shock peened circular spots 158. The laser firing each sequence has multiple laser firings or pulses with a period between firings that is often referred to a "rep". During the rep, the part is moved so that the next pulse occurs at the location of the next laser shocked peened circular spot 158. Preferably, the part is moved continuously and timed to be at the appropriate location at the pulse or firing of the laser beam. One or more repeats of each sequence may be used to hit each laser shocked peened circular spot 158 more than once. This may also allow for less laser power to be used in each firing or laser pulse.

The fan blade 108 typically may have an airfoil about 11 inches long, a chord length about 3.5 inches, and laser shock peening blade surfaces 154 about 2 inches long along the leading edge LE. The laser shock peened blade surfaces 154 are about 0.5 inches wide (W). A first row 164 of laser shocked peened circular spots 158 nearest the leading edge LE extends beyond the leading edge by about 20% of the laser spot diameter D which is about 0.27" thus imparting deep compressive residual stresses in the pre-stressed blade region 156 below the laser shock peening blade surfaces 154 which extend about 0.5 inches from the leading edge.

While the preferred embodiment of the present invention has been described fully in order to explain its principles, it is understood that various modifications or alterations may be made to the preferred embodiment without departing from the scope of the invention as set forth in the appended claims.

We claim:

1. A method for quality control of a laser shock peening process of production workpieces, said method comprising the following steps:

(a) producing a first interferometric image of a laser shock peened patch on one of the workpieces, wherein the laser shock peened patch has at least a first laser shock peened surface and a first laser shocked region having deep compressive residual stresses imparted by the laser shock peening extending into the workpiece from the first laser shock peened surface;

(b) producing a second interferometric image of the laser shock peened patch while stressing the laser shock peened patch; and (c) producing an image of fringes by overlapping the first and second images and using the image of the fringes for quality assurance of the laser shock peening process of production workpieces.

2. A method as claimed in claim 1 further comprising the following step:

(d) comparing the images of fringes of at least some of the production workpieces in a laser shock peening production run of the production workpieces to a predetermined correlation of images of fringes and high cycle fatigue failure based on high cycle fatigue tests of test workpieces with shock peened patches.

3. A method as claimed in claim 2 wherein the interferometric images are produced by holographic laser interferometry including reflecting a low power measuring laser beam off of the patch onto a interferometric image recording means for recording interferometric images while simultaneously directing a low power reference laser beam onto the interferometric image recording means.

4. A method as claimed in claim 3 wherein said interferometric image recording means is a camera.

5. A method as claimed in claim 3 wherein said interferometric image recording means is a digital camera and the images of fringes are displayed on a monitor.

6. A method as claimed in claim 3 wherein said stressing the laser shock peened patch includes loading the production and test workpieces during said production of the first and second images by interferometry while the production and test workpieces are fixtured.

7. A method as claimed in claim 6 wherein said loading consists of applying a load to the production and test workpieces, wherein said load is chosen from a group of loads consisting of heating, twisting, or bending of at least a portion of the production and test workpieces.

8. A method as claimed in claim 1 wherein the interferometry includes reflecting a low power measuring laser beam off of the patch onto a interferometric image recording means while simultaneously directing a low power reference laser beam onto the interferometric image recording means.

9. A method as claimed in claim 8 wherein said interferometric image recording means is a camera.

10. A method as claimed in claim 8 wherein said stressing the laser shock peened patch includes loading the production workpieces during said production of the first and second images by interferometry while the production and test workpieces are fixtured.

11. A method as claimed in claim 2 wherein said high cycle fatigue tests are run on test workpieces having a failure precipitating flaw within the shock peened patches.

12. A method as claimed in claim 2 wherein said comparing the production images of fringes includes comparing fringe characteristics of the laser shock peened patches on the production workpieces laser against fringe characteristics of the predetermined correlation.

13. A method as claimed in claim 12 wherein said fringe characteristics include density of fringe lines.

14. A method as claimed in claim 12 wherein said fringe characteristics include intensity of fringe lines.

15. A method as claimed in claim 12 wherein said fringe characteristics include breadth of fringe lines.

16. A method as claimed in claim 12 wherein said interferometric image recording means is a camera.

17. A method as claimed in claim 16 wherein said interferometric image recording means is a digital camera and the images of fringes are displayed on a monitor.

18. A method as claimed in claim 10 wherein said loading consists of applying a load to the production and test workpieces, wherein said load is chosen from a group of loads consisting of heating, twisting, or bending of at least a portion of the production and test workpieces.

19. A method as claimed in claim 18 wherein said comparing the production images of fringes includes comparing fringe characteristics of the laser shock peened patches on the production workpieces laser against fringe characteristics of the predetermined correlation.

20. A method as claimed in claim 19 wherein said high cycle fatigue tests are run on test workpieces having a failure precipitating flaw within the shock peened patches.

* * * * *